Sept. 24, 1968  J. F. WELLMAN  3,402,906
CAMERA LAMP BRACKET
Filed Oct. 31, 1966
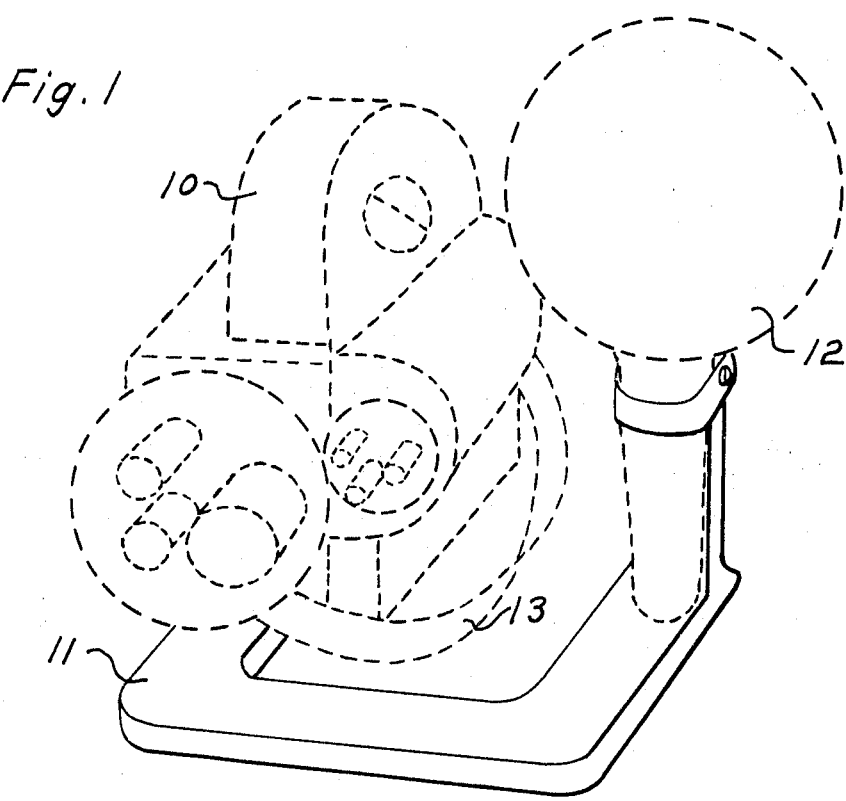
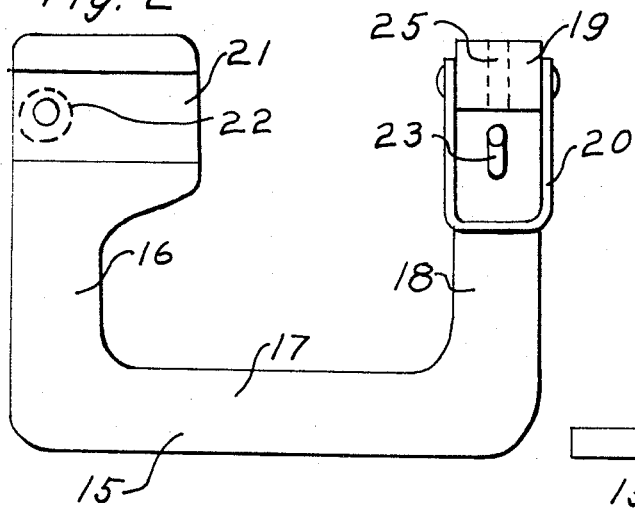
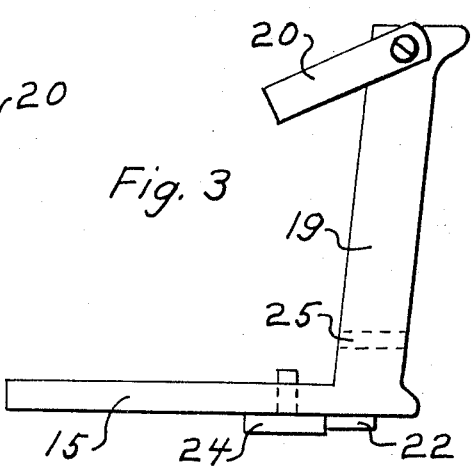
INVENTOR
Joseph F. Wellman
BY
Robert A. Halvorsen

United States Patent Office 3,402,906
Patented Sept. 24, 1968

3,402,906
CAMERA LAMP BRACKET
Joseph F. Wellman, 1722 48th Ave. N.,
St. Petersburg, Fla. 33714
Filed Oct. 31, 1966, Ser. No. 590,833
5 Claims. (Cl. 248—205)

ABSTRACT OF THE DISCLOSURE

A U shaped bracket for rigidly connecting an electric lamp to a portable camera, so proportioned as not to interfere with the proper grasping of the camera by the hand of the operator.

---

This invention relates to brackets commonly used to attach portable electric lamps to hand-held movie cameras.

The recent increase in live news coverage by television broadcasts has resulted from improvements in cameras, films and lamps which made possible photography under almost any condition of illumination.

The majority of professional photographers use a three lens turret camera, and frequently supplement the environmental illumination by means of a lamp attached to the camera by a simple straight bar fastened to the bottom of the camera and projecting therefrom a distance adequate to prevent contact between the camera and the lamp housing. This conventional straight bar prevents the photographer from holding the camera in the proper manner.

The prime object of this invention is to provide a bracket which will not interfere with the photographer's hand grip on the camera.

Another object is to provide a bracket of such rigidity as to insure the continued alignment of the lamp with the axis of the camera lens.

A further object is to provide a bracket which can be utilized with various types of lamps, and which permits the photographer to observe the lamp charging signal located in the lamp handle.

A still further object is to provide a bracket which acts as a substantial base to permit the combined camera and lamp to be safely rested upon any horizontal surface.

Other objects will be apparent to one skilled in the art from a study of the following description and drawings in which FIGURE 1 represents a perspective view of a conventional camera and lamp, connected by the bracket of this invention.

FIGURE 2 shows a plan view of the bracket.

FIGURE 3 shows a side view of the bracket.

In the drawings in which like numerals represent similar parts, a conventional movie camera 10 is shown mounted upon bracket 11 which also supports a conventional electric lamp 12. There are several such lamps commercially available, most of which are energized by electric storage batteries suspended from the photographer's shoulder. Such lamps have substantially similar exterior proportions and my bracket will accommodate almost all of the presently available lamps.

Movie camera 10 is conventionally designed to be held at its bottom, the fingers of the photographer's left hand being inserted under a leather band 13 which then supports the back of the left hand.

Those straight lamp brackets heretofore used have prevented this recommended grip on the camera, in that the brackets project from the bottom of the camera directly through that zone where the left hand properly should be.

I have found that if the bracket 11 is made U shaped, the camera may be properly held even when the lamp is attached. Further, the use of my bracket improves the balance of the camera so that it may be used even more comfortably and accurately with bracket and lamp attached, than with the camera alone. This has changed the habits of professional photographers who have found that it is usually undesirable to remove the bracket and lamp even if the use of the lamp for supplemental illumination is not contemplated.

Bracket 11 comprises a generally flat base 15 which is adapted to be fastened to the bottom of a movie camera by means of a conventional properly proportioned slot 21 and knurled head screw 22 which is threaded into a hole conventionally provided in cameras for such purpose. The close fit between the slot 21 and the camera base insures rigid alignment of the lens and the lamp.

Base 15 has a camera supporting arm 16 which projects toward the front of camera 10, a distance equal to the width of a man's hand. Connecting arm 17 then projects at about a right angle from arm 16 away from the camera 10, a distance of about four inchease, adequate to provide for the thickness of a man's hand and also to provide clearance between camera 10 and the lamp 12. A lamp supporting arm 18 projects from arm 17 parallel to arm 16, forming a generally horse-shoe shape to base 15 as shown.

An electric lamp support 19 is provided at the far end of arm 18 and projects upwardly therefrom.

Support 19 is proportioned to conform to the vertically positioned handle of lamp 12, and has a flexible strap 20 adjacent its upper end for firmly but detachably fastening lamp 12 to support 19.

Strap 20 may be permanently attached to support 19 or alternately may be removable from support 19. Strap 20 may be constructed of leather, but is preferably made of thin sheet metal, pivotally attached to support 19 to permit a self tightening, but easily released attachment of lamp 12 to support 19. An elongated clearance hole 23 is provided in arm 18 to receive a knurled head screw 24 which fits into a threaded hole in the base of the handle of lamp 12, to rigidly hold lamp 12 to arm 18.

Support 19 is also provided with a generally horizontal viewing aperture adjacent its lower end, so located and proportioned to permit the photographer to view therethrough a battery charging indicator which is conventionally provided in the handle of lamp 12.

Various cameras and lamps commercially available have minor variations in their sizes and proportions. It has been found that my invention can be used with the major portion of such equipment which is currently used by professional photographers.

The proportions of arms 16, 17 and 18 of base 15 are preferably somewhat larger than is necessary for adequate strength or size to accommodate a photographer's hand, for the purpose of providing such a large base that the camera-lamp combination can safely rest on the ground or a table without danger of its tipping over.

While I have shown and described a preferred embodiment of my invention, other arrangements may be apparent to one skilled in the art within the scope of my invention. I intend to be limited only within the scope of the claims.

I claim as my invention:

1. In a device of the character described
   (a) a generally horizontal flat bracket having a U shape comprising a camera supporting arm having a longitudinally axis parallel to the axis of the camera lens, a lamp supporting arm parallel thereto, and a connecting arm extending between adjacent ends of the camera supporting arm and the lamp supporting arm, said arms being so proportioned as to permit the insertion of a man's hand between said arms, (b) a lamp support projecting upwardly from said lamp supporting arm, said support having at its upper end a strap adapted to removably fasten a lamp to said lamp support.

2. A device as described in claim 1, wherein the generally flat bracket is proportioned to extend substantially beyond the center of gravity of the combined camera, lamp and bracket, to provide a substantial support therefor.

3. A device as described in claim 1 wherein an elongated slot is provided in the camera supporting arm, proportioned to closely fit the base of the camera.

4. A device as described in claim 1 wherein a viewing aperture is provided in the lamp support, so located and proportioned as to permit the operator to observe a battery charge indicator in the lamp handle.

5. A device as described in claim 1 wherein said lamp supporting arm is provided with an elongated slot adjacent the upwardly projecting lamp support, said slot being proportioned to slidably receive a screw provided for fastening a lamp to said lamp supporting arm.

References Cited

UNITED STATES PATENTS 2,479,716  8/1949  Bensen _____ 95—86 XR
3,074,338  1/1963  Hanscom _____ 95—86

ROY D. FRAZIER, *Primary Examiner.*

J. F. FOSS, *Assistant Examiner.*